US012686396B2

(12) United States Patent
Kim

(10) Patent No.: US 12,686,396 B2
(45) Date of Patent: Jul. 21, 2026

(54) DRIVING ASSISTANCE APPARATUS AND DRIVING ASSISTANCE METHOD

(71) Applicant: HL KLEMOVE CORP., Incheon (KR)

(72) Inventor: Mincheol Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 147 days.

(21) Appl. No.: 18/628,721

(22) Filed: Apr. 6, 2024

(65) Prior Publication Data

US 2025/0091591 A1 Mar. 20, 2025

(30) Foreign Application Priority Data

Sep. 19, 2023 (KR) ......................... 10-2023-0125137

(51) Int. Cl.
| | |
|---|---|
| *B60W 50/00* | (2006.01) |
| *G06N 3/00* | (2023.01) |
| *G06N 3/08* | (2023.01) |
| *G06T 5/00* | (2024.01) |
| *G06T 5/70* | (2024.01) |

(52) U.S. Cl.
CPC ........... *B60W 50/0098* (2013.01); *G06N 3/08* (2013.01); *G06T 5/70* (2024.01); *B60W 2420/403* (2013.01)

(58) Field of Classification Search
CPC ........ B60W 50/0098; B60W 2420/403; G06T 5/70; G06N 3/08
USPC ............................................................. 701/1
See application file for complete search history.

(56) References Cited

U.S. PATENT DOCUMENTS

| | | | | |
|---|---|---|---|---|
| 11,222,415 B2 | 1/2022 | Ozcan et al. | | |
| 11,303,820 B2 | 4/2022 | Wang | | |
| 2018/0300855 A1* | 10/2018 | Tang | ......................... | G06N 3/09 |
| 2019/0228273 A1* | 7/2019 | Merrill | ................... | G06N 3/045 |
| 2021/0133943 A1* | 5/2021 | Lee | ........................... | G06T 5/60 |
| 2023/0232121 A1* | 7/2023 | Jung | .................... | G06N 3/0464 |
| | | | | 348/222.1 |
| 2025/0014327 A1* | 1/2025 | Kiyohara | ............. | G06V 10/993 |

FOREIGN PATENT DOCUMENTS

KR      10-2021-0059712      5/2021

\* cited by examiner

*Primary Examiner* — Tiffany P Young
(74) *Attorney, Agent, or Firm* — WOMBLE BOND DICKINSON (US) LLP

(57) ABSTRACT

A driving assistance apparatus includes a camera disposed on at least one of a front, sides, or a rear of a vehicle and configured to capture an image of at least one of the front, sides, or rear of the vehicle, and a controller configured to process image data provided from the camera, wherein the controller recognizes whether a surrounding environment of the vehicle is a low-illuminance environment, generates corrected image data using a first artificial neural network model trained to generate the corrected image data in which the image data has been corrected based on the image data when recognizing the low-illuminance environment, and performs traveling control of the vehicle based on the generated corrected image data.

17 Claims, 7 Drawing Sheets

[FIG. 1]
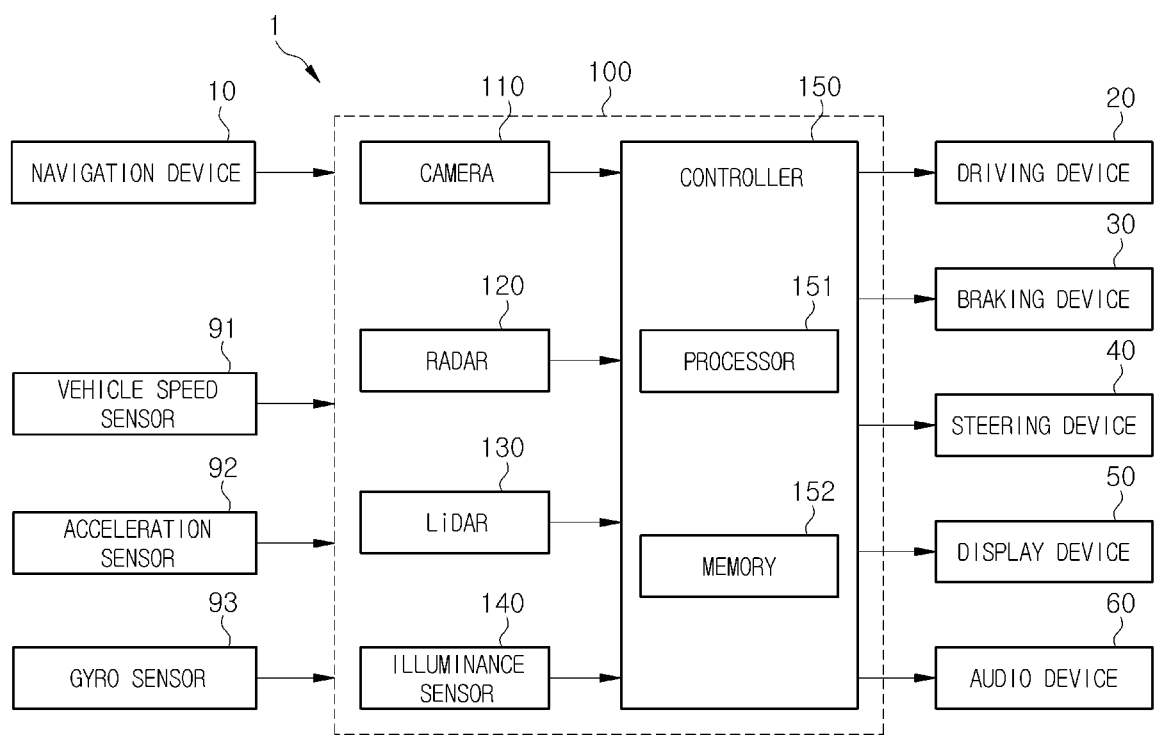

[FIG. 2]
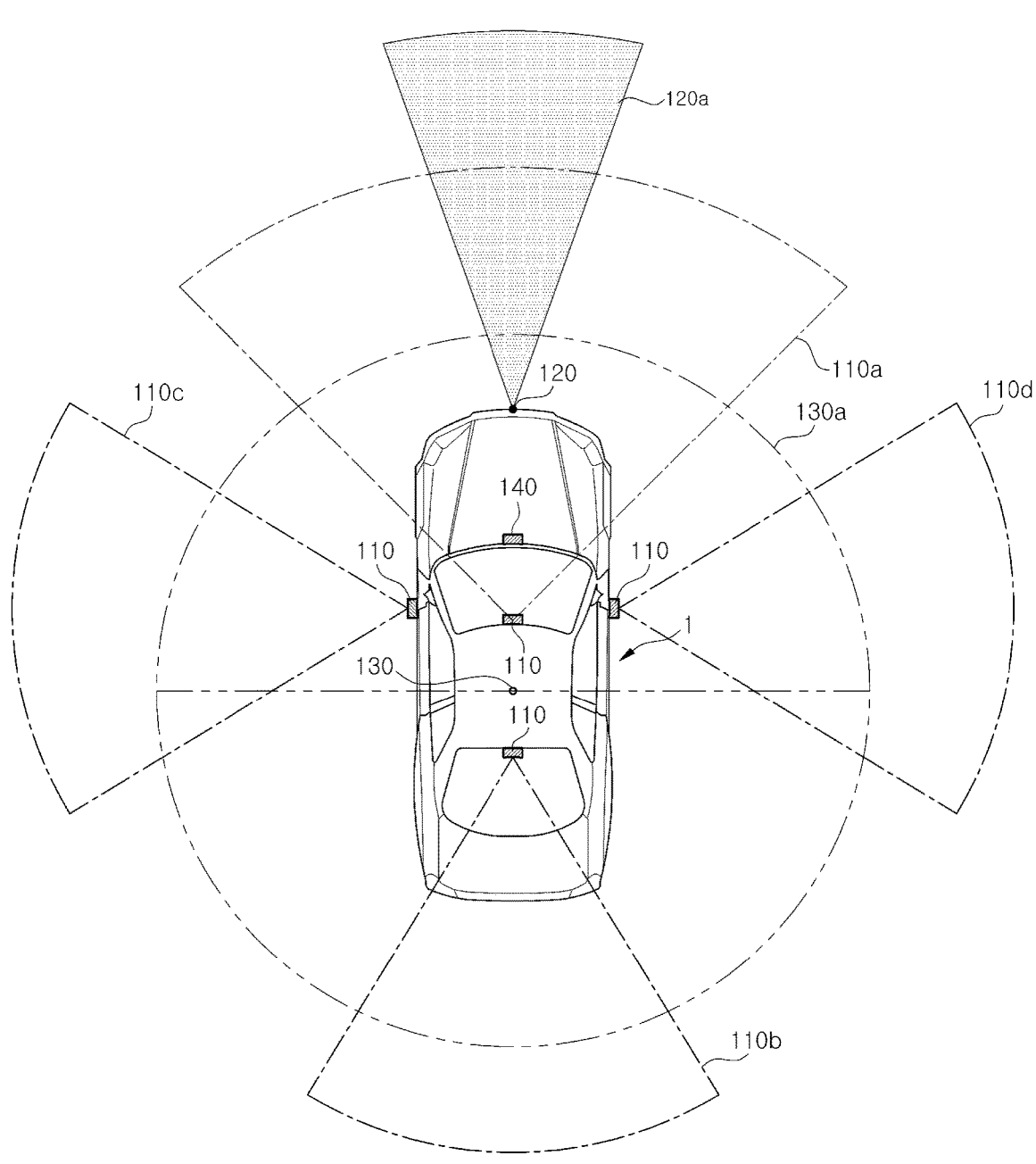

[FIG. 3]
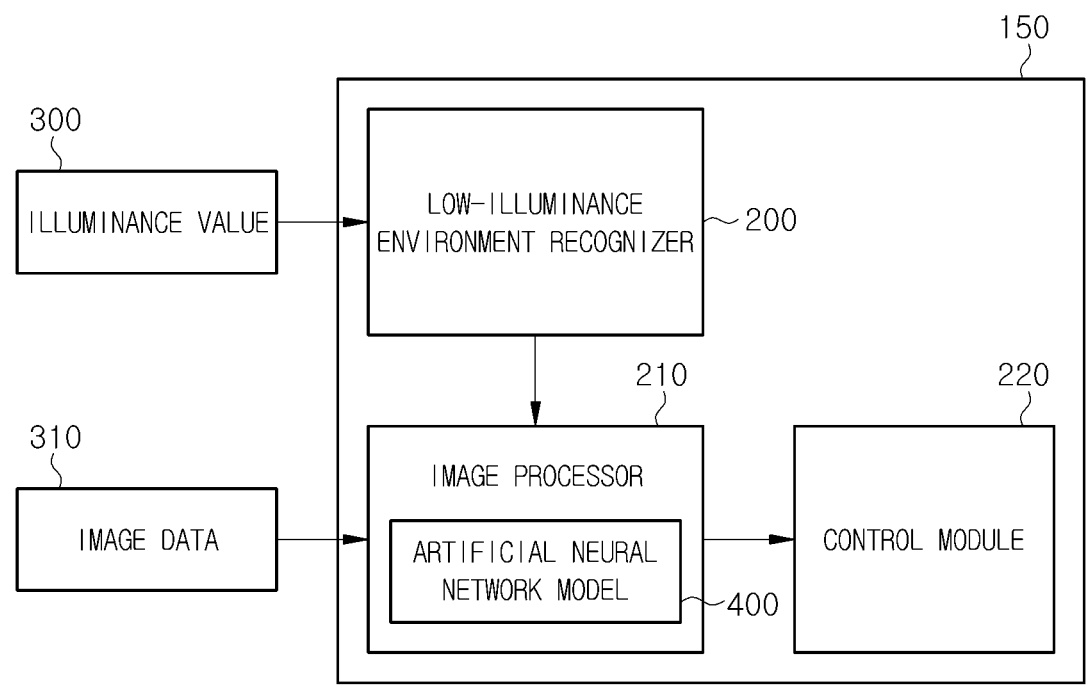
[FIG. 4]
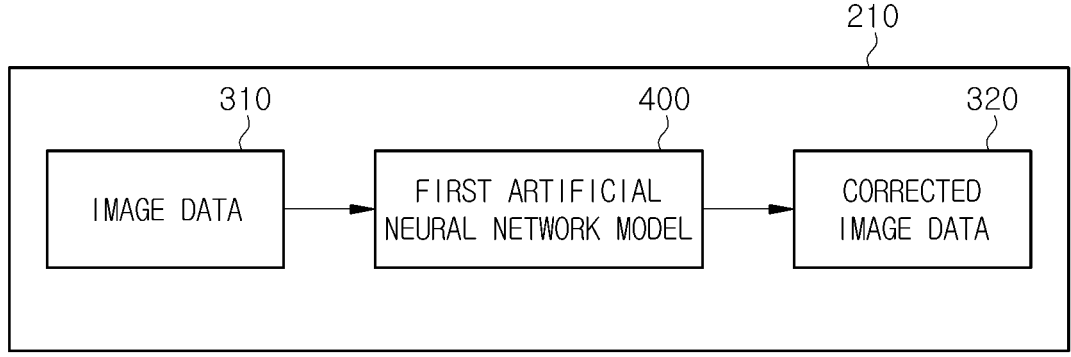

[FIG. 5]
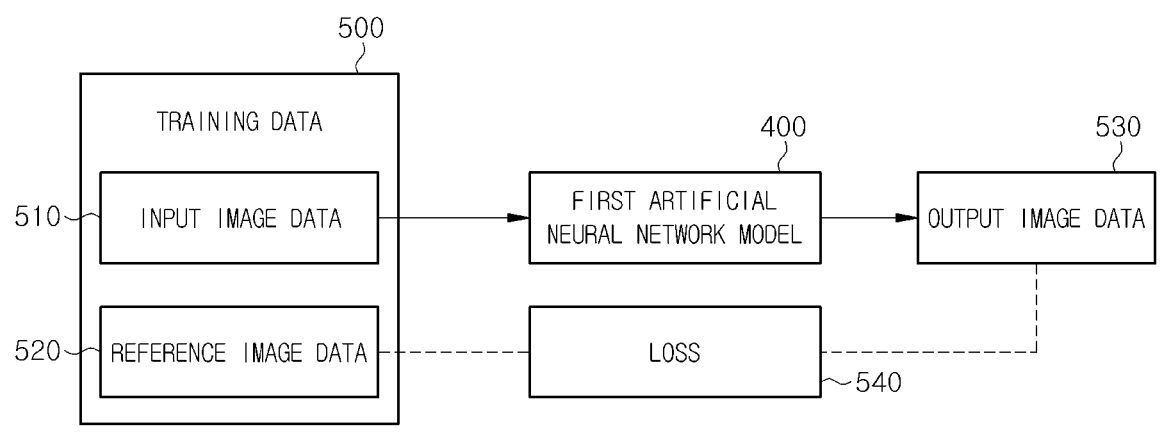
[FIG. 6]
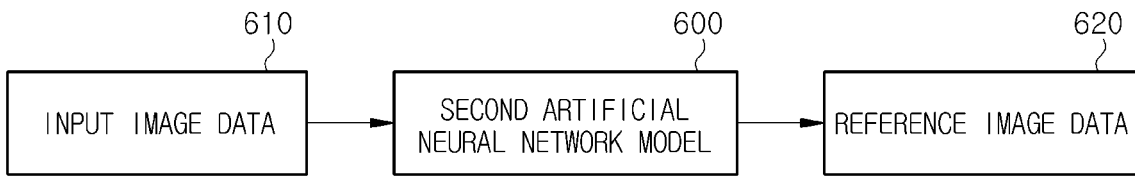

[FIG. 7]

[FIG. 8]
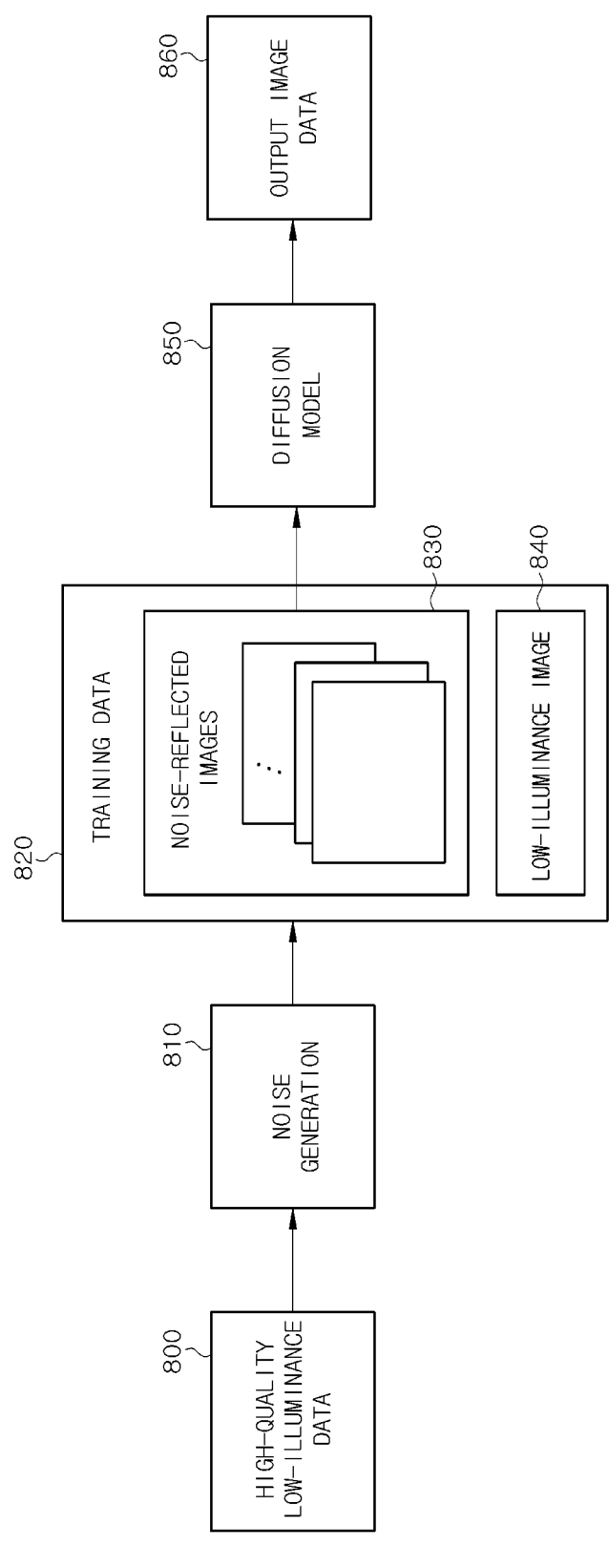

[FIG. 9]
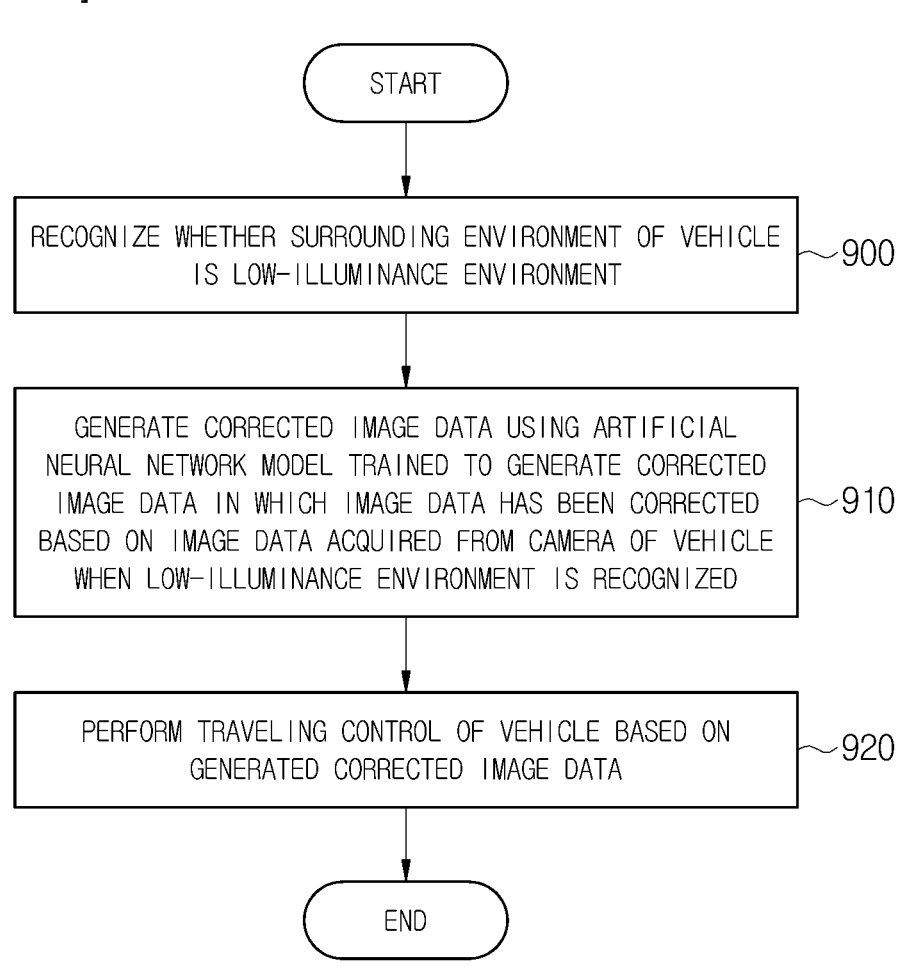

DRIVING ASSISTANCE APPARATUS AND DRIVING ASSISTANCE METHOD

CROSS-REFERENCE TO RELATED APPLICATION

This application claims the benefit of Korean Patent Application No. 10-2023-0125137, filed on Sep. 19, 2023 in the Korean Intellectual Property Office, the disclosure of which is incorporated herein by reference herein in its entirety.

BACKGROUND

1. Field

Embodiments of the present disclosure relate to a driving assistance apparatus and a driving assistance method, which are capable of improving the quality of low-illuminance images.

2. Description of the Related Art

In general, vehicles provided with an advanced driver assist system (ADAS) actively provide information about a vehicle state, a driver state, and/or a surrounding environment in order to reduce a driver's burden and further improve convenience.

The ADAS requires multiple cameras for capturing images of the surrounding environments in order to recognize surrounding environments of the vehicle, and research on a high-performance image signal processor (ISP) for a vehicle including a high dynamic range (HDR) function in order to obtain high-quality camera images is being actively conducted.

However, since high costs, high power consumption, and wide space are required to use the high-performance ISP in the ADAS that requires multiple cameras, a software ISP using an embedded board is applied actually. However, since the software ISP has the performance that processes image signals acquired in low-illuminance environments such as night or entering a tunnel that is lower than that of the high-performance ISP, the quality of low-illuminance images is also low. Therefore, the performance of application functions such as object detection (OD) and surround view monitoring (SVM) that use camera images can be degraded.

Thus, there is a need for a method of improving the quality of the low-illuminance images using an artificial neural network in the ADAS to which the low-performance ISP is applied and which improves the performance of application functions used for traveling of a vehicle.

SUMMARY

Therefore, it is an aspect of the present disclosure to provide a driving assistance apparatus and a driving assistance method, which are for improving the quality of low-illuminance images using an artificial neural network and controlling traveling of a vehicle using the improved images.

It is another aspect of the present disclosure to provide a driving assistance apparatus and a driving assistance method, which are capable of providing more accurate information to a driver by improving the performance of various application functions used for driving assistance.

Additional aspects of the disclosure will be set forth in part in the description which follows and, in part, will be obvious from the description, or may be learned by practice of the disclosure.

In accordance with one aspect of the present disclosure, a driving assistance apparatus includes a camera disposed on at least one of a front, sides, or a rear of a vehicle and configured to capture an image of at least one of the front, sides, or rear of the vehicle, and a controller configured to process image data provided from the camera, wherein the controller recognizes whether a surrounding environment of the vehicle is a low-illuminance environment, generates corrected image data using a first artificial neural network model trained to generate the corrected image data in which the image data has been corrected based on the image data when recognizing the low-illuminance environment, and performs traveling control of the vehicle based on the generated corrected image data.

The image data may comprise low-illuminance image data having a first brightness value and a first noise amount.

The corrected image data may comprise image data that has a second brightness value greater than the first brightness value and a second noise amount smaller than the first noise amount.

The driving assistance apparatus may further include an illuminance sensor configured to measure an illuminance value near the vehicle, wherein the controller may determine whether the illuminance value measured by the illuminance sensor is smaller than or equal to a preset first critical value, and recognize the surrounding environment of the vehicle as the low-illuminance environment when the measured illuminance value is smaller than or equal to the first critical value.

The controller may be configured to analyze the image data and determine whether the image data is low-illuminance image data and recognize the surrounding environment of the vehicle as the low-illuminance environment when it is determined that the image data is the low-illuminance image data.

The controller may be configured to calculate at least one of a brightness value or a noise amount of the image data, and determine that the image data is the low-illuminance image data based on at least one of the calculated brightness value or noise amount.

The controller may be configured to calculate brightness values for each pixel of the image data, determine whether the number of pixels of which the calculated brightness value is smaller than or equal to a preset second critical value is greater than or equal to a preset critical number, and determine that the image data is the low-illuminance image data when the number of pixels is greater than or equal to the critical number.

The controller may be configured to calculate the noise amount of the image data, and determine that the image data is the low-illuminance image data when the calculated noise amount is greater than or equal to a preset third critical value.

The controller may be configured to input the image data to the first artificial neural network model, and generate the corrected image data in which brightness and noise of the image data have been corrected using the first artificial neural network model.

The artificial neural network model may be configured to output the corrected image data by performing at least one of demosaicing, denoising, white balancing, colorization, contrast correction, or demoireing on the image data using the image data as an input.

The controller may be configured to train the first artificial neural network model based on training data including first image data and reference image data corresponding to ground truth of the first image data.

The controller may be configured to input the first image data to the first artificial neural network model, generate first corrected image data in which the first image data has been corrected using the first artificial neural network model, and train the first artificial neural network model so that a difference between the first corrected image data and the reference image data converges to a preset minimum critical value.

The controller may be configured to generate the training data using a second artificial neural network model trained to output the reference image data using the first image data as an input.

The second artificial neural network model may be based on a generative adversarial network (GAN) model or diffusion model.

In accordance with another aspect of the present disclosure, a driving assistance method includes recognizing whether a surrounding environment of a vehicle is a low-illuminance environment, generating corrected image data using a first artificial neural network model trained to generate the corrected image data in which image data has been corrected based on the image data obtained by capturing an image of at least one of a front, sides, or a rear of the vehicle when the low-illuminance environment is recognized, and performing traveling control of the vehicle based on the generated corrected image data.

The recognizing of whether the surrounding environment of the vehicle is the low-illuminance environment may include determining whether an illuminance value measured by an illuminance sensor of the vehicle is smaller than or equal to a preset first critical value, and recognizing the surrounding environment of the vehicle as the low-illuminance environment when the measured illuminance value is smaller than or equal to the first critical value.

The recognizing of whether the surrounding environment of the vehicle is the low-illuminance environment may include analyzing the image data and determining whether the image data is low-illuminance image data, and recognizing the surrounding environment of the vehicle as the low-illuminance environment when it is determined that the image data is the low-illuminance image data.

The generating of the corrected image data using the first artificial neural network model may include inputting the image data to the first artificial neural network model, and generating the corrected image data in which brightness and noise of the image data have been corrected using the first artificial neural network model.

The driving assistance method may further include inputting first image data among training data including the first image data and reference image data corresponding to ground truth of the first image data to the first artificial neural network model, generating first corrected image data in which the first image data has been corrected using the first artificial neural network model, and training the first artificial neural network model so that a difference between the first corrected image data and the reference image data converges to a preset minimum critical value.

The driving assistance method may further include generating training data used to train the first artificial neural network model using a second artificial neural network model trained to output reference image data corresponding to ground truth of first image data using the first image data as an input.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a view illustrating a configuration of a vehicle according to one embodiment;

FIG. 2 is a view illustrating fields of view of a camera, a radar, and a light detection and ranging (LiDAR) included in a driving assistance apparatus according to one embodiment;

FIG. 3 is a view illustrating functional modules of a controller included in the driving assistance apparatus according to one embodiment;

FIG. 4 is an exemplary view for describing an operation of an image processor according to one embodiment;

FIG. 5 is an exemplary view for describing a learning process of a first artificial neural network model according to one embodiment;

FIG. 6 is an exemplary view for describing an operation of a controller for generating reference image data using a second artificial neural network model according to various embodiments;

FIG. 7 is an exemplary view for describing a learning process of the second artificial neural network model according to various embodiments;

FIG. 8 is an exemplary view for describing the learning process of the second artificial neural network model according to various embodiments; and FIG. 9 is a view illustrating an operation of a driving assistance system according to one embodiment.

DETAILED DESCRIPTION

The same reference numbers indicate the same components throughout the specification. The present specification does not describe all elements of embodiments, and general contents or overlapping contents between the embodiments in the technical field to which the disclosure pertains will be omitted. The terms "unit," "module," "member," and "block" used in the specification may be implemented as software or hardware, and in some embodiments, a plurality of "units," "modules," "members," and "blocks" may be implemented as one component, or one "unit," "module," "member," and "block" may include a plurality of components.

Throughout the specification, when a first component is described as being "connected" to a second component, this includes not only a case in which the first component is directly connected to the second component but also a case in which the first component is indirectly connected to the second component, and the indirect connection includes connection through a wireless communication network.

In addition, when a certain portion is described as "including," a certain component, this means further including other components rather than precluding other components unless especially stated otherwise.

Throughout the specification, when a first member is described as being positioned "on" a second member, this includes both a case in which the first member is in contact with the second member and a case in which a third member is present between the two members.

Terms such as first and second are used to distinguish one component from another, and the components are not limited by the above-described terms.

A singular expression includes plural expressions unless the context clearly dictates otherwise.

In each operation, identification symbols are used for convenience of description, and the identification symbols do not describe the sequence of each operation, and each operation may be performed in a different sequence from the specified sequence unless a specific sequence is clearly described in context.

Hereinafter, an operation principle and embodiments of the present disclosure will be described with reference to the accompanying drawings.

FIG. 1 is a view illustrating a configuration of a vehicle according to one embodiment. In addition, FIG. 2 is a view illustrating fields of view of a camera, a radar, and a light detection and ranging (LiDAR) included in a driving assistance apparatus according to one embodiment.

As illustrated in FIG. 1, a vehicle 1 may include a navigation device 10, a driving device 20, a braking device 30, a steering device 40, a display device 50, an audio device 60, and/or a driving assistance apparatus 100. In addition, the vehicle 1 may further include sensors 91, 92, and 93 for detecting a dynamic of the vehicle 1. For example, the vehicle 1 may further include a vehicle speed sensor 91 for detecting a longitudinal speed of the vehicle 1, an acceleration sensor 92 for detecting a longitudinal acceleration and a transverse acceleration of the vehicle 1, and/or a gyro sensor 93 for detecting a yaw rate, a roll rate, and a pitch rate of the vehicle 1.

The navigation device 10, the driving device 20, the braking device 30, the steering device 40, the display device 50, the audio device 60, a plurality of sensors 91, 92, and 93, the driving assistance apparatus 100 may communicate with one another via a vehicle communication network NT. For example, the electric devices 10, 20, 30, 40, 50, 60, 91, 92, 93, and 100 included in the vehicle 1 may exchange data via Ethernet, media oriented systems transport (MOST), Flexray, a controller area network (CAN), a local interconnect network (LIN), or the like.

The navigation device 10 may generate a route to a destination input by a driver and provide the generated route to the driver. The navigation device 10 may receive a Global Navigation Satellite System (GNSS) signal from a GNSS and identify an absolute position (coordinates) of the vehicle 1 based on the GNSS signal. The navigation device 10 may generate the route to the destination based on the position (coordinates) of the destination input by the driver and a current position (coordinates) of the vehicle 1.

The navigation device 10 may provide map data and position information of the vehicle 1 to the driving assistance apparatus 100. In addition, the navigation device 10 may provide information about the route to the destination to the driving assistance apparatus 100. For example, the navigation device 10 may provide the driving assistance apparatus 100 with information about a distance to an entry ramp through which the vehicle 1 enters a new road, a distance to an exit ramp through which the vehicle 1 exits the road on which the vehicle 1 currently travels, or the like.

The driving device 20 may move the vehicle 1 and include, for example, an engine, an engine management system (EMS), a transmission, and a transmission control unit (TCU). The engine may generate power for the vehicle 1 to travel, and the EMS may control the engine in response to a driver's acceleration intention conveyed through an accelerator pedal or a request of the driving assistance apparatus 100. The transmission may transmit the power generated by the engine to wheels, and the TCU may control the transmission in response to a driver's transmission command conveyed through a transmission lever and/or a request of the driving assistance apparatus 100.

The braking device 30 may stop the vehicle 1 and include, for example, a brake caliper and a brake control module (EBCM). The brake caliper may decelerate the vehicle 1 or stop the vehicle 1 using friction with a brake disk, and the EBCM may control the brake caliper in response to a driver's braking intention conveyed through a brake pedal and/or a request of the driving assistance apparatus 100. For example, the EBCM may receive a deceleration request including a deceleration from the driving assistance apparatus 100 and electrically or hydraulically control the brake caliper so that the vehicle 1 decelerates depending on the requested deceleration.

The steering device 40 may include an electronic power steering control module (EPS). The steering device 40 may change a traveling direction of the vehicle 1, and the EPS may assist with an operation of the steering device 40 so that the driver may easily manipulate a steering wheel in response to the driver's steering intention conveyed through a steering wheel. In addition, the EPS may control the steering device in response to a request of the driving assistance apparatus 100. For example, the EPS may receive a steering request including a steering torque from the driving assistance apparatus 100 and control the steering device to steer the vehicle 1 depending on the requested steering torque.

The display device 50 may include a cluster, a head-up display, a center fascia monitor, or the like and provide various pieces of information and entertainments to the driver through images and sounds. For example, the display device 50 may provide traveling information of the vehicle 1, a warning message, or the like to the driver.

The audio device 60 may include a plurality of speakers and provide various pieces of information and entertainments to the driver through sounds. For example, the audio device 60 may provide traveling information of the vehicle 1, a warning message, or the like to the driver.

The driving assistance apparatus 100 may communicate with the navigation device 10, the plurality of sensors 91, 92, and 93, the driving device 20, the braking device 30, the steering device 40, the display device 50, and the audio device 60 via the vehicle communication network. The driving assistance apparatus 100 may receive the information about the route to the destination and the position information of the vehicle 1 from the navigation device 10 and acquire the information on the vehicle speed, the acceleration, and/or the angular speed of the vehicle 1 from the plurality of sensors 91, 92, and 93.

The driving assistance apparatus 100 may provide various functions for safety to the driver. For example, the driving assistance apparatus 100 may provide lane departure warning (LDW), lane keeping assist (LKA), high beam assist (HBA), autonomous emergency braking (AEB), traffic sign recognition (TSR), adaptive cruise control (ACC), blind spot detection (BSD), or the like.

The driving assistance apparatus 100 may include a camera 110, a radar 120, a LIDAR 130, an illuminance sensor 140, and a controller 150. The driving assistance apparatus 100 is not limited to that illustrated in FIG. 1. For example, at least one detector of the camera 110, the radar 120, or the LiDAR 130 may be omitted from the driving assistance apparatus 100 illustrated in FIG. 1, or various detectors capable of detecting nearby objects of the vehicle 1 may be added thereto. A front, side, or rear sensor capable of detecting a front, sides, or rear of the vehicle may include the camera 110, the radar 120, and the LiDAR 130, and a plurality of cameras 110, radars 120, and LiDARs 130 may be provided and disposed on the front, sides, or rear of the vehicle.

The camera 110, the radar 120, the LiDAR 130, the illuminance sensor 140, and the controller 150 may be provided separately from one another. For example, the controller 150 may be installed in a housing separated from a housing of the camera 110, a housing of the radar 120, a housing of the LiDAR 130, and a housing of the illuminance sensor 140. The controller 150 may exchange data with the camera 110, the radar 120, the LiDAR 130, or the illuminance sensor 140 via a broad-bandwidth network.

In addition, at least some of the camera 110, the radar 120, the LiDAR 130, the illuminance sensor 140, and the controller 150 may be provided integrally. For example, the camera 110 and the controller 150 may be provided in one housing, the radar 120 and the controller 150 may be provided in one housing, the LiDAR 130 and the controller 150 may be provided in one housing, or the illuminance sensor 140 and the controller 150 may be provided in one housing.

The camera 110 may capture an image of surroundings of the vehicle 1 and acquire image data of the surroundings of the vehicle 1. For example, as illustrated in FIG. 2, the camera 110 may be installed on each of a front windshield, a rear windshield, and/or side mirrors of the vehicle 1 and may have forward, rearward, and/or both sides fields of view 110a, 110b, 110c, and 110d of the vehicle 1.

The camera 110 may include a plurality of lenses and an image sensor. The image sensor may include a plurality of photodiodes for converting light into electrical signals, and the plurality of photodiodes may be disposed in the form of a two-dimensional matrix.

The driving assistance apparatus 100 may include an image processor for converting electrical signals of the camera 110 into image signals, and the image processor may be, for example, provided integrally with the camera 110 or integrally with the controller 150.

The image processor may generate image data by processing electrical signals acquired from the image sensor of the camera 110 and transmit the image data to the controller 150. The image data may include, for example, information about another vehicle, a pedestrian, a cyclist, or a lane line (marker for distinguishing a lane) positioned near the vehicle 1.

The radar 120 may transmit transmission radio waves toward the surroundings of the vehicle 1 and detect the nearby objects of the vehicle 1 based on reflected radio waves reflected from the nearby objects. For example, as illustrated in FIG. 2, the radar 120 may be installed on a grille or bumper of the vehicle 1 and may have a forward field of sensing 120a of the vehicle 1.

The radar 120 may include a transmission antenna (or a transmission antenna array) for radiating transmission radio waves toward the surroundings of the vehicle 1 and a reception antenna (or a reception antenna array) for receiving reflected radio waves reflected from objects.

The radar 120 may acquire radar data from the transmission radio waves transmitted by the transmission antenna and the reflected radio waves received by the reception antenna. The radar data may include position information (e.g., distance information) and/or speed information of front objects of the vehicle 1.

The driving assistance apparatus 100 may include a signal processor for processing the radar data of the radar 120, and the signal processor may be, for example, provided integrally with the radar 120 or integrally with the controller 150.

The signal processor may acquire the radar data from the reception antenna of the radar 120 and generate data on the dynamic of the object by clustering reflection points of the reflected signal. The signal processor may, for example, acquire a distance to the object based on a time difference between a transmission time of the transmission radio waves and a reception time of the reflected radio waves and acquire a speed of the object based on a frequency difference between the transmission radio waves and the reflected radio waves.

The signal processor may transmit data on the dynamic of the nearby object of the vehicle 1 acquired from the radar data to the controller 150.

The LiDAR 130 may emit light (e.g., infrared rays) toward the surroundings of the vehicle 1 and detect nearby objects of the vehicle 1 based on reflected light reflected from the nearby objects. For example, as illustrated in FIG. 2, the LiDAR 130 may be installed on a roof of the vehicle 1 and may support fields of view 130a in all directions near the vehicle 1.

The LiDAR 130 may include a light source (e.g., a light emitting diode, a light emitting diode array, a laser diode, or a laser diode array) for emitting light (e.g., infrared rays) and an optical sensor (e.g., a photodiode or a photodiode array) for receiving light (e.g., infrared rays). In addition, if necessary, the LiDAR 130 may further include a driving device for rotating the light source and/or the optical sensor.

While the light source and/or the optical sensor rotate, the LiDAR 130 may emit light through the light source and receive the light reflected from objects through the optical sensor, thereby acquiring LiDAR data.

The LiDAR data may include relative positions (distances and/or directions of nearby objects) and/or relative speeds of the nearby objects of the vehicle 1.

The driving assistance apparatus 100 may include a signal processor capable of processing the LiDAR data of the LiDAR 130, and the signal processor may be, for example, provided integrally with the LiDAR 130 or integrally with the controller 150.

The signal processor may generate data on the dynamic of the object by clustering the reflection points by the reflected light. The signal processor may, for example, acquire a distance to the object based on a time difference between a light transmission time and a light reception time. In addition, the signal processor may acquire a direction (or an angle) of the object with respect to a traveling direction of the vehicle 1 based on a direction in which the light source emits light when the optical sensor receives the reflected light.

The signal processor may transmit data on the dynamic of the nearby object of the vehicle 1 acquired from the LiDAR data to the controller 150.

The illuminance sensor 140 may measure an illuminance near the vehicle 1. For example, as illustrated in FIG. 2, the illuminance sensor 140 may be installed on the front windshield or an upper end of a hood close to the front windshield of the vehicle 1, but is not limited to this.

The controller 150 may be electrically connected to the camera 110, the radar 120, the LiDAR 130, and/or the illuminance sensor 140. In addition, the controller 150 may be connected to the navigation device 10, the driving device 20, the braking device 30, the steering device 40, the display device 50, the audio device 60, and/or a plurality of sensors 91, 92, and 93 via the vehicle communication network NT.

The controller 150 may process the image data of the camera 110, the radar data of the radar 120, and/or the LiDAR data of the LiDAR 130 and provide control signals to the driving device 20, the braking device 30, and/or the steering device 40.

In the disclosed embodiment, when the surrounding of the vehicle 1 is a low-illuminance environment, the controller 150 may process the image data of the camera 110 to acquire corrected image data and provide control signals for controlling traveling of the vehicle 1 based on the acquired corrected image data to the driving device 20, the braking device 30, and/or the steering device 40. In the low-illuminance environment, the image data may be low-illuminance image data. For example, the controller 150 may perform object detection (OD), vehicle surround monitoring (SVM), or the like using the corrected image data and provide the control signals for controlling the traveling of the vehicle 1 based on this to the driving device 20, the braking device 30, and/or the steering device 40.

The controller 150 may include a processor 151 and a memory 152.

The memory 152 may store programs and/or data for processing the image data, the radar data, and/or the LiDAR data. In addition, the memory 142 may store programs and/or data for generating driving, braking, and steering signals.

The memory 152 may temporarily store the image data received from the camera 110, the radar data received from the radar 120, and the LiDAR data received from the LiDAR 130 and temporarily store the processing results of the image data, the radar data, and/or the LiDAR data of the processor 141. In the disclosed embodiment, the memory 152 may store at least one artificial neural network model to be described below.

The memory 152 may include not only volatile memories such as a static random access memory (SRAM) and a dynamic RAM (DRAM) but also non-volatile memories such as a flash memory, a read only memory (ROM), and an erasable programmable ROM (EPROM).

The processor 151 may process the image data of the camera 110, the radar data of the radar 120, and/or the LiDAR data of the LiDAR 130. For example, the processor 151 may fuse the image data, the radar data, and/or the LiDAR data and output fusion data.

Based on a result of processing the fusion data, the processor 151 may generate a driving signal, a braking signal, and/or a steering signal for controlling the driving device 20, the braking device 30, and/or the steering device 40, respectively. For example, the processor 151 may predict a collision with the nearby object of the vehicle 1 using the fusion data and control the driving device 20, the braking device 30, and/or the steering device 40 to drive, steer, or brake the vehicle 1 accordingly.

The processor 151 may include the image processor for processing the image data of the camera 110, the signal processor for processing the radar data of the radar 120 and/or the LiDAR data of the LiDAR 130, or a micro control unit (MCU) for generating driving, braking, and steering signals.

According to the disclosed embodiment, the processor 151 may recognize whether it is a low-illuminance environment based on an illuminance value measured by the illuminance sensor 140, generate the corrected image data by processing the image data of the camera when it is the low-illuminance environment, and generate the driving signal, the braking signal, and/or the steering signal for respectively controlling the driving device 20, the braking device 30, and/or the steering device 40 based on the generated corrected image data.

In order to generate the corrected image data, the processor 151 may use an artificial neural network model trained to output a corrected image data using low-illuminance image data as an input. The artificial neural network model will be described in detail below with reference to FIG. 4.

As described above, when the low-illuminance environment is recognized, the controller 150 may generate the corrected image data by processing the image data of the camera and provide the driving signal, the braking signal, or the steering signal to control the traveling of the vehicle based on the generated corrected image data.

Hereinafter, a detailed operation of the driving assistance apparatus 100 will be described below in more detail.

FIG. 3 is a view illustrating functional modules of a controller included in the driving assistance apparatus according to one embodiment.

Referring to FIG. 3, the controller 150 may functionally include a plurality of modules. Each of the modules may be a hardware module (e.g., an application specific integrated circuit (ASIC) or a field programmable gate array (FPGA)) included in the processor 151 or a software module (e.g., an application program or data) stored in the memory 152.

As illustrated in FIG. 3, the controller 150 may include a low-illuminance environment recognizer 200, an image processor 210, and a control module 220.

The low-illuminance environment recognizer 200 of the controller 150 may receive an illuminance value 300 near the vehicle, which is measured by the illuminance sensor 140 and recognize the surrounding of the vehicle as the low-illuminance environment when the received illuminance value 300 is smaller than a preset critical value. In various embodiments, the low-illuminance environment recognizer 200 may receive image data 310 from the camera 110 and analyze the received image data 310 to determine whether the received image data 310 is low-illuminance image data, and thus recognize the surrounding of the vehicle as the low-illuminance environment. For example, the low-illuminance environment recognizer 200 may obtain a brightness value of each pixel of the image data, determine that the received image data is the low-illuminance image data when the number of pixels having the brightness value close to "0" is greater than or equal to a preset critical number, and recognize the surrounding of the vehicle as the low-illuminance environment.

The image processor 210 of the controller 150 may generate the corrected image data using an artificial neural network model (hereinafter referred to as "first artificial neural network model 400") trained to generate the corrected image data based on the image data. An operation of the image processor 210 for generating the corrected image data using the first artificial neural network model 400 will be exemplarily described with reference to FIG. 4.

FIG. 4 is an exemplary view for describing an operation of an image processor according to one embodiment.

Referring to FIG. 4, the first artificial neural network model 400 trained to output corrected image data 320 using the image data 310 as an input. Here, the image data 310 may be image data of an image captured in the low-illuminance environment. For example, the image data 310 may be image data in which the number of pixels having the brightness value close to "0" is greater than or equal to the preset critical number, but is not limited thereto. In some embodiments, the image data 310 may have a first brightness value, a first sharpness, and/or a first noise value corresponding to a low illuminance. In various embodiments, the low-illuminance image may have a low brightness, a low sharpness, and a large amount of noise, and in this case, the image data 310 may have a first brightness value that is smaller than a preset critical brightness value in order to determine that the image is the low-illuminance image, the first sharpness that is smaller than a preset critical sharpness in order to determine that the image is the low-illuminance image, and/or the first noise amount that is greater than a preset critical noise amount in order to determine that the image is the low-illuminance image.

The image processor 210 may input the image data 310 to the first artificial neural network model 400 and generate the corrected image data 320 using the first artificial neural network model 400. Here, the corrected image data 320 may be image data that has a higher brightness, sharpness, and/or resolution and less amount of noise than the image data 310, but is not limited thereto. According to some embodiments, the corrected image data 320 may have a second brightness value that is greater than the first brightness value, a second sharpness that is greater than the first sharpness, and/or a second noise amount that is smaller than the first noise amount. In various embodiments, the corrected image data 320 may be high-quality low-illuminance image data with improved image quality compared to the image data 310.

According to one embodiment, the first artificial neural network model 400 may use an artificial neural network (ANN), a convolutional neural network (CNN), generative adversarial networks (GAN), a vision transformer (ViT), a super network CNN (SRCNN), a denoising network (D-Net), a deblurring network (Deblur-Net), a colorization network (Deblur-Net), a style transfer, and/or a pyramidal CNN (PyNet) for improving the image quality, but is not limited thereto. For example, the first artificial neural network model 400 may be configured to output the corrected image data 320 by performing at least one of demosaicing, denoising, white balancing, colorization, contrast correction, or demoireing on the input image data 310.

Referring back to FIG. 3, the control module 220 of controller 150 may perform application functions, such as OD and/or SVM, using the corrected image data 320 and generate control signals for controlling the traveling of the vehicle according to a result of the performance. For example, the control module 220 may generate a vehicle control signal for autonomous driving by performing object detection using the corrected image data 320. In addition, the control module 220 may generate a control signal for autonomous driving or parking assistance by monitoring the surrounding of the vehicle. In various embodiments, the control module 220 may provide more accurate information for the driver to drive the vehicle by controlling the corrected image data 320 to be displayed on the display device of the vehicle 1.

FIG. 5 is an exemplary view for describing a training process of a first artificial neural network model according to one embodiment.

Referring to FIG. 5, training data 500 used for training the first artificial neural network model 400 may include input image data 510 of images captured in the low-illuminance environment, which is used as input data of the first artificial neural network model 400, and high-quality reference image data 520 of images captured in the low-illuminance environment, which is used as correct answer data (i.e., ground truth) of the first artificial neural network model 400.

For example, the input image data 510 may be low-quality image data processed by a low-performance image signal processor, and the reference image data 520 may be high-quality image data processed by a high-performance image signal processor. The reference image data 520 may have a higher brightness and/or sharpness and less amount of noise than the input image data 510.

The controller 150 may input the input image data 510 to the first artificial neural network model 400 and train the first artificial neural network model 400 so that the first artificial neural network model 400 corrects the input image data 510 and generates high-quality output image data 530.

In particular, the controller 150 may calculate a loss 540 for the output image data 530 and train the first artificial neural network model 400 while updating a weight of the artificial neural network model 400 by loss backpropagation to minimize the calculated loss 540. Here, the loss 540 may be a difference between the output image data 530, which is the output value of the first artificial neural network model 400, and the reference image data 520 corresponding to the ground truth. In order to calculate the loss, the controller 150 may use a loss function. For example, the loss function may include mean a squared error (MSE) loss, a perceptual loss, a structural similarity index (SSIM) loss, and/or a VGG loss, but is limited thereto, and various loss functions may be used so that a difference between two images converges to a minimum critical value such as "0."

According to various embodiments, when the vehicle 1 does not include the high-performance image signal processor, the controller 150 may generate the reference image data to be used as the ground truth of the input image data and perform the training of the first artificial neural network model 400 using the generated reference image data. In order to generate the reference image data, the controller 150 may use an artificial neural network model (hereinafter referred to as "second artificial neural network model") trained to generate the reference image data based on various low-illuminance image data. An operation of the controller 150 for generating the reference image data using the second artificial neural network model will be exemplarily described with reference to FIG. 6.

FIG. 6 is an exemplary view for describing an operation of a controller for generating reference image data using a second artificial neural network model according to various embodiments.

Referring to FIG. 6, a second artificial neural network model 600 trained to output reference image data 620 using input image data 610 as an input. Here, the input image data 610 may be low-illuminance image data processed by a low-performance image signal processor, but is not limited thereto.

The controller 150 may input the input image data 610 to the second artificial neural network model 600 and generate the reference image data 620 using the second artificial neural network model 600. Here, the reference image data 620 may be correct answer data used to train and test the first artificial neural network model 400. The correct answer data may be original or actual data of the data to be trained. In the disclosed embodiment, the correct answer data may be high-quality low-illuminance image data or high-quality image data.

For example, the second artificial neural network model 600 may be a generative model for learning given training data and generating similar data that follows the distribution of the training data. In various embodiments, the generative model may include a generator of a generative adversarial network (GAN).

Figure 7:
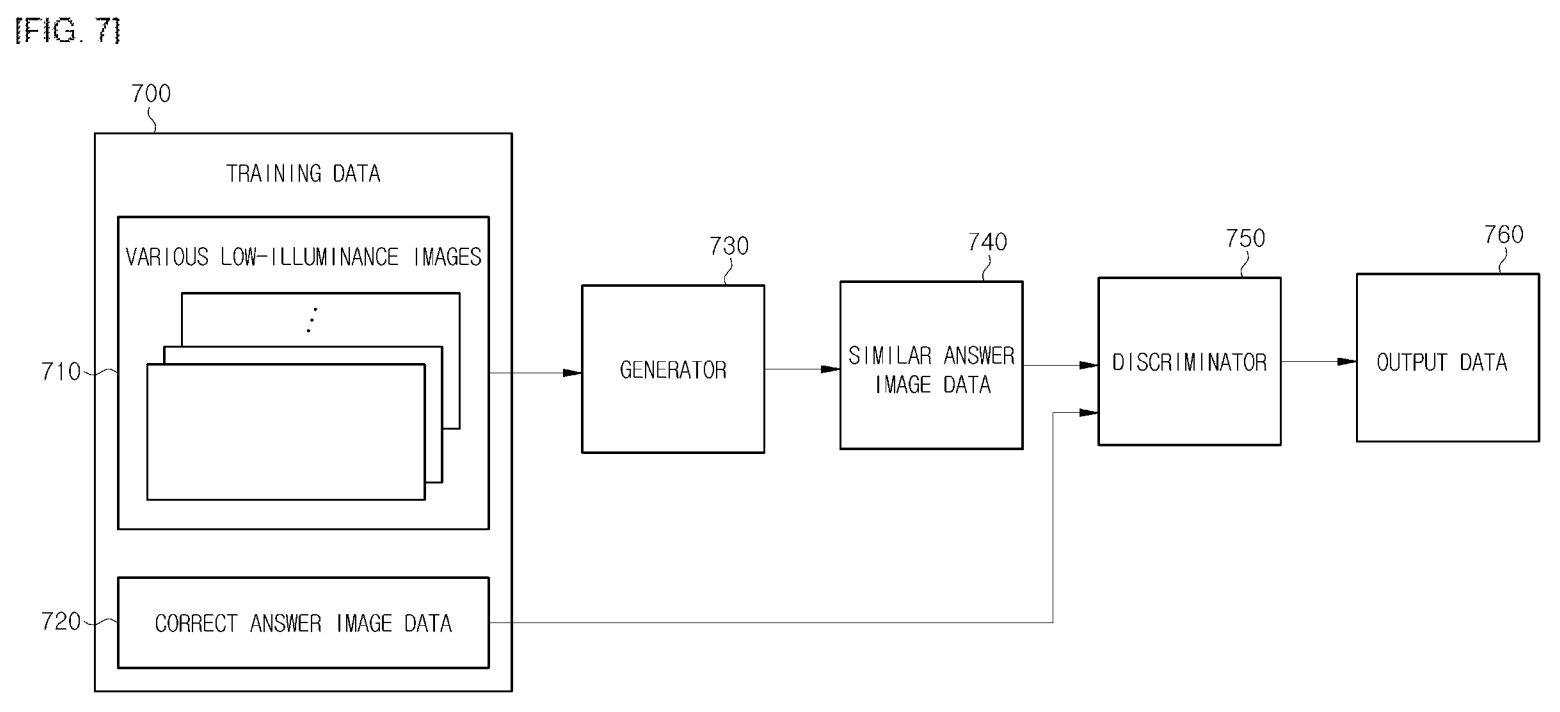

A learning process of the second artificial neural network model 600 for generating the reference image data 620 will be described in more detail with reference to FIG. 7.

FIG. 7 is an exemplary view for describing the training process of the second artificial neural network model according to various embodiments.

Referring to FIG. 7, a third artificial neural network model including a generator 730 and a discriminator 750 is illustrated. The generator 730 may be trained through a training process to be described below, and the trained generator 730 may be used as the second artificial neural network model 600.

The third artificial neural network model may include the generator 730 trained to generate data similar to the correct answer data of the input data based on the input data and the discriminator 750 trained to determine the similar data and the correct answer data output from the generator 730.

The controller 150 may train the generator 730 by training the third artificial neural network model using the training data 700.

The training data 700 used to train the third artificial neural network model may include various low-illuminance images 710 used as the input data of the generator 730 and the correct answer image data 720 used as the ground truth of the discriminator 750.

For example, the various low-illuminance images 710 may be images with different low-illuminance values, different images with similar low-illuminance values, or different images with different low-illuminance values, which are processed by the low-performance image signal processor, but are not limited thereto. The correct answer image data 720 may be high-quality images with different low-illuminance values, different high-quality images with similar low-illuminance values, or different high-quality images with different low-illuminance values, but are not limited thereto. For example, the similar low-illuminance value may be a low-illuminance value that has a preset critical difference value from the low-illuminance value of any first image among various low-illuminance images 710 included in the training data 700, but is limited thereto.

Specifically, the controller 150 may input the various low-illuminance images 710 to the generator 730 and generate similar answer image data 740 similar to the correct answer image data 720 using the generator 730.

The controller 150 may input the correct answer image data 720 and the generated similar answer image data 740 to the discriminator 750 and acquire output data 760 representing a probability value of each of the correct answer image data 720 and the similar answer image data 740 using the discriminator 750. Here, the probability value may include values between 0 and 1, and a value closer to 1 may correspond to the correct answer.

The controller 150 may calculate a first loss for a probability value of the correct answer image data 720, calculate a second loss for a probability value of the similar answer image data 740, and then train the discriminator 750 while updating a weight of the discriminator 750 by the loss backpropagation to minimize a final loss based on the first loss and the second loss. For example, the final loss may be the sum of the first loss and the second loss.

In addition, the controller 150 may train the generator 730 while updating a weight of the generator 730 by the loss backpropagation to minimize the first loss for the probability value of the similar answer image data 740. These losses may be acquired by the above-described loss function.

As described above, the controller 150 may easily acquire the training data used to train the first artificial neural network model 400 using the artificial neural network even without the high-performance image signal processor by inputting the input image data 610 to the trained generator

730 (i.e., the second artificial neural network model 600) and generating the reference image data 620 using the trained generator 730.

FIG. 8 is an exemplary view for describing the training process of the second artificial neural network model according to various embodiments.

Referring to FIG. 8, the second artificial neural network model 600 may use a diffusion model 850 that gradually removes noise from the image data including the noise and finally generates image data with minimized noise. The diffusion model 850 trained through a training process to be described below may be used as the second artificial neural network model 600.

In order to train the diffusion model 850, the controller 150 may generate training data 820. Specifically, the controller 150 may perform noise generation 810 on the high-quality low-illuminance image 800 corresponding to the correct answer image data and generate the training data 820 including noise-reflected images 830 and low-illuminance image 840. Here, the low-illuminance image 840 may be an image corresponding to the high-quality low-illuminance image 800.

The noise generation 810 may be a process of repeatedly reflecting a preset noise distribution in the high-quality low-illuminance image 800 according to a preset number of times (T) and generating the images (Xt) 830 in which the noise is reflected multiple times. For example, the controller 150 may generate the images (i.e., the noise-reflected images 830) to which the noise is added T times by gradually adding the preset noise distribution to the high-quality low-illuminance image 800 corresponding to an original image.

The controller 150 may input the generated noise-reflected images 830 and low-illuminance image 840 to the diffusion model 850 and generate output image data 860 using the diffusion model 850. Specifically, the controller 150 may train the diffusion model 850 to output the output image data 860 corresponding to the high-quality low-illuminance image from which the noise has been completely removed using a denoising distribution corresponding to a direction opposite to that of the noise distribution used T times when generating the noise-reflected images 830.

In other words, the controller 150 may generate T training images (i.e., the noise-reflected images 830) generated from the original image and input the number of times (T) reflecting the noise and the image (Xt) in which the noise has been completely reflected among the generated learning images to the diffusion model 850. Here, the image in which the noise has been completely reflected may be an image in which the noise has been reflected T times. For example, when T is 1000, an image in which the noise has been completely reflected may be an image in which the noise has been reflected 1000 times.

Subsequently, the controller 150 may generate an image from which a portion of the noise has been removed using the diffusion model 850 and input the number of times (T−1) in which the noise has been reflected in the corresponding image together with the generated image to the diffusion model 850. The controller 150 may generate an image from which a portion of the noise has been removed twice using the diffusion model 850. The controller 150 may repeat this process to train the diffusion model 850 to finally generate the image from which the noise has been completely removed. Here, the image in which the noise has been completely removed may be an image in which the noise has been removed T times.

The trained diffusion model 850 may be used as the second artificial neural network model 600 described above with reference to FIG. 6. The controller 160 may easily acquire the training data used to train the first artificial neural network model 400 using the artificial neural network even without the high-performance image signal processor by inputting the input image data 610 to the trained diffusion model 850 and generating the reference image data 620 (i.e., the high-quality low-illuminance image) using the trained diffusion model 850.

In various embodiments, the second artificial neural network model 600 has been described as being based on the above-described GAN model or diffusion mode, but is not limited thereto. For example, the second artificial neural network model 600 may use various artificial neural network models that may be trained to generate the high-quality low-illuminance image using the low-illuminance image as an input. In various embodiments, the artificial neural network model may be generated by combining two or more. For example, the artificial neural network model may be generated by a combination of an artificial neural network model trained to generate a first output image data primarily using the low-illuminance image as an input and an artificial neural network model trained to generate the high-quality low-illuminance image secondarily using the first output image data as an input.

FIG. 9 is a view illustrating an operation of a driving assistance system according to one embodiment.

Referring to FIG. 9, the controller 150 may recognize whether the surrounding environment of the vehicle 1 is a low-illuminance environment (900). Specifically, the controller 150 may acquire an illuminance value measured by the illuminance sensor 140, determine whether the acquired illuminance value is smaller than or equal to a preset first critical value in order to determine a low illuminance, and recognize the surrounding of the vehicle as the low-illuminance environment when the illuminance value is smaller than or equal to the first critical value. In various embodiments, the controller 150 may analyze image data acquired through cameras provided on the front, both sides, and/or rear of the vehicle, calculate a brightness value of each pixel of the image data, and determine whether the number of pixels of which the calculated brightness value is smaller than or equal to a preset second critical value is greater than or equal to a preset critical number. When the number of pixels is greater than or equal to the critical number, the controller 150 may determine that the image data are the low-illuminance image data and recognize the surrounding of the vehicle as the low-illuminance environment.

In the disclosed embodiment, when recognizing the low-illuminance environment, the controller 150 may generate the corrected image data using the artificial neural network model (i.e., the first artificial neural network model 400) trained to output the corrected image data in which the image data has been corrected using the image data acquired from the cameras of the vehicle 1 as an input (910). Here, the image data may be low-illuminance image data processed by the image signal processor in the embedded board of the vehicle 1.

Specifically, the controller 150 may input the image data to the first artificial neural network model 400 and generate the corrected image data using the first artificial neural network model 400. The generated corrected image data may be high-quality image data compared to the input image data, and the high-quality image data may be image data that has a higher brightness, sharpness, and/or resolution and less amount of noise than the input image data.

In the disclosed embodiment, the controller 150 may perform the traveling control of the vehicle 1 based on the generated corrected image data (920). Specifically, the controller 150 may control autonomous driving, braking, and/or parking of the vehicle by performing OD, SVM, and the like based on the corrected image data.

As is apparent from the above description, according to the disclosed disclosure, by improving the quality of an image captured in a low-illuminance environment using an artificial neural network without adding a high-performance image signal processor, it is possible to provide application functions such as OD and SVM with more precise and improved performance.

In addition, according to the disclosed disclosure, by improving the quality of a low-illuminance image using an artificial neural network in a driving assistance system to which a low-performance image signal processor is applied, it is possible to improve the performance of application functions used for traveling control of a vehicle.

In addition, according to the disclosed disclosure, by easily generating training data used to train an artificial neural network without a high-performance image signal processor, it is possible to minimize the costs, power consumption, and space consumption.

Meanwhile, disclosed embodiments may be implemented in the form of a recording medium in which commands executable by a computer are stored. The commands may be stored in the form of program code, and when executed by a processor, program modules are generated to perform operations of the disclosed embodiments. The recording medium may be implemented as a computer-readable recording medium.

The computer-readable recording medium includes any type of recording media in which commands that may be decoded by a computer are stored. For example, there may be a ROM, a RAM, a magnetic tape, a magnetic disk, a flash memory, an optical data storage device, or the like.

A device-readable storage medium may be provided in the form of a non-transitory storage medium. Here, "non-transitory storage medium" is a tangible device and only means not including a signal (e.g., electromagnetic waves), and this term does not distinguish between cases in which data is stored semi-permanently and temporarily in the storage medium. For example, "non-temporary storage medium" may include a buffer in which data is temporarily stored.

As described above, the disclosed embodiments have been described with reference to the accompanying drawings. Those skilled in the art to which the present disclosure pertains will understand that the present disclosure can be carried out in the form different from those of the disclosed embodiments even without changing the technical spirit or essential features of the present disclosure. The disclosed embodiments are illustrative and should not be construed as being limited.

What is claimed is:

1. A driving assistance apparatus comprising:
a camera associated with a vehicle, the camera configured to generate an image data of a surrounding environment of the vehicle; and
a controller configured to process the image data provided from the camera,
wherein the controller is further configured to:
recognize whether the surrounding environment of the vehicle is in a low-illuminance environment by calculating a noise amount of the image data provided by the camera and determining that the image data is low-illuminance image data when the calculated noise amount of the image data provided by the camera is greater than or equal to a preset critical noise amount;

when the surrounding environment of the vehicle is in the low-illuminance environment, correct the image data of the surrounding environment of the vehicle provided by the camera using an artificial neural network model trained to generate the corrected image data; and perform control of the vehicle based on the image data of the surrounding environment of the vehicle corrected using the artificial neural network model.

2. The driving assistance apparatus of claim 1, wherein the controller is further configured to correct the image data of the surrounding environment of the vehicle provided by the camera using the artificial neural network model such that a brightness value of the image data of the surrounding environment of the vehicle provided by the camera is increased and a noise amount of the image data of the surrounding environment of the vehicle provided by the camera is decreased.

3. The driving assistance apparatus of claim 1, wherein the image data corrected using the artificial neural network model comprises image data having a brightness value greater than a brightness value of the image data provided by the camera and a noise amount smaller than a noise amount of the image data provided by the camera.

4. The driving assistance apparatus of claim 1, further comprising an illuminance sensor configured to measure the illuminance around the vehicle, wherein the controller is further configured to compare the illuminance around the vehicle measured by the illuminance sensor with a preset critical illuminance measurement value to determine whether the surrounding environment of the vehicle is in the low-illuminance environment.

5. The driving assistance apparatus of claim 1, wherein the controller is further configured to determine whether the illuminance of the image data provided by the camera is lower than or equal to the preset critical illuminance by:

calculating a brightness value of the image data provided by the camera; and determining whether the image data provided by the camera is the low-illuminance image data based on the calculated brightness value of the image data provided by the camera.

6. The driving assistance apparatus of claim 5, wherein the controller is further configured to determine whether the illuminance of the image data provided by the camera is lower than or equal to the preset critical illuminance by:

calculating brightness values for each pixel of the image data provided by the camera;

determining whether a number of pixels of which the calculated brightness values are smaller than or equal to a preset critical brightness value is greater than or equal to a preset critical pixel number; and determining that the image data is the low-illuminance image data when the number of pixels of which the calculated brightness values are smaller than or equal to the preset critical brightness value is greater than or equal to the preset critical pixel number.

7. The driving assistance apparatus of claim 1, wherein the controller is further configured to:

input the image data provided by the camera to the artificial neural network model; and generate the corrected image data in which brightness and noise of the image data provided by the camera have been corrected using the artificial neural network model.

8. The driving assistance apparatus of claim 1, wherein the artificial neural network model is configured to output the corrected image data by performing at least one of demosaicing, denoising, white balancing, colorization, contrast correction, or demoireing on the image data provided by the camera using the image data provided by the camera as an input for training.

9. The driving assistance apparatus of claim 1, wherein the controller is further configured to train the artificial neural network model based on training data including first image data and reference image data corresponding to ground truth of the first image data.

10. The driving assistance apparatus of claim 9, wherein the controller is further configured to:

input the first image data to the artificial neural network model;

generate first corrected image data in which the first image data has been corrected using the artificial neural network model; and train the artificial neural network model so that a difference between the first corrected image data and the reference image data converges to a preset minimum critical value.

11. The driving assistance apparatus of claim 9, wherein the controller is further configured to generate the training data using another artificial neural network model trained to output the reference image data using the first image data as an input for training.

12. The driving assistance apparatus of claim 11, wherein the another artificial neural network model is based on a generative adversarial network (GAN) model or diffusion model.

13. A driving assistance method comprising:

recognizing whether a surrounding environment of a vehicle is in a low-illuminance environment by calculating a noise amount of the image data provided by the camera and determining that the image data is low-illuminance image data when the calculated noise amount of the image data provided by the camera is greater than or equal to a preset critical noise amount;

when the surrounding environment of the vehicle is in the low-illuminance environment, correcting image data of the surrounding environment of the vehicle using an artificial neural network model trained to generate the corrected image data; and performing control of the vehicle based on the image data of the surrounding environment of the vehicle corrected using the artificial neural network model.

14. The driving assistance method of claim 13, wherein the recognizing of whether the surrounding environment of the vehicle is in the low-illuminance environment includes:

comparing the illuminance measured by an illuminance sensor of the vehicle with a preset critical illuminance measurement value; and when the illuminance measured by the illuminance sensor is smaller than or equal to the preset critical illuminance measurement value, determining that the surrounding environment of the vehicle is in the low-illuminance environment.

15. The driving assistance method of claim 13, wherein the correcting of the image data of the surrounding environment of the vehicle using the artificial neural network model includes:

inputting the image data of the surrounding environment of the vehicle to the artificial neural network model; and generating the corrected image data in which brightness and noise of the image data of the surrounding environment of the vehicle have been corrected using the artificial neural network model.

16. The driving assistance method of claim 13, further comprising:

inputting first image data among training data including the first image data and reference image data corresponding to ground truth of the first image data to the artificial neural network model;

generating first corrected image data in which the first image data has been corrected using the artificial neural network model; and training the artificial neural network model so that a difference between the first corrected image data and the reference image data converges to a preset minimum critical value.

17. The driving assistance method of claim 13, further comprising generating training data used to train the artificial neural network model using another artificial neural network model trained to output reference image data corresponding to ground truth of first image data using the first image data as an input for training.

*  *  *  *  *